United States Patent [19]

Cartwright

[11] Patent Number: 4,755,427
[45] Date of Patent: Jul. 5, 1988

[54] REINFORCING FIBERS

[75] Inventor: Craig L. Cartwright, Manhatten Beach, Calif.

[73] Assignee: Massachusetts Institute of Technology, Cambridge, Mass.

[21] Appl. No.: 812,398

[22] Filed: Dec. 23, 1985

[51] Int. Cl.4 .............................................. D02G 3/00
[52] U.S. Cl. .................................... 428/361; 428/362; 428/367; 428/369; 428/371; 428/391; 428/392; 428/366; 428/379; 428/394
[58] Field of Search ............... 428/369, 371, 362, 367, 428/392, 361, 375, 391, 373, 366, 379

[56] References Cited

U.S. PATENT DOCUMENTS

| | | | |
|---|---|---|---|
| 3,044,146 | 7/1962 | Thomas et al. | 28/78 |
| 3,073,005 | 1/1963 | Tiede | 428/370 |
| 4,026,690 | 5/1977 | McClellan | 65/2 |
| 4,089,727 | 5/1978 | McLain | 156/350 |
| 4,220,496 | 9/1980 | Carley et al. | 156/174 |
| 4,220,497 | 9/1980 | Carley | 156/174 |
| 4,241,002 | 12/1980 | Knox | 264/168 |
| 4,346,052 | 8/1982 | Knox | 264/176 F |

FOREIGN PATENT DOCUMENTS

| | | | |
|---|---|---|---|
| 2127418 | 10/1972 | France | 428/371 |
| 43-12663 | 5/1968 | Japan | 428/371 |
| 1208293 | 10/1970 | United Kingdom | 428/371 |

OTHER PUBLICATIONS

"Some Properties of Composite Metals Reinforced with Helical Fiber" Kagawa et al., *Composite Materials Ed., Proc. Japan-U.S. Conference*, Tokyo 1981.

"Fiber Breakage in Reinforced Polymer Processing", von Turkovich, Jan. 1982, Massachusetts Institute of Technology (thesis).

"Carbon and Graphite Fibers", Noyes Data Corporation, 1980.

*Primary Examiner*—Lorraine T. Kendell
*Attorney, Agent, or Firm*—Hamilton, Brook, Smith & Reynolds

[57] ABSTRACT

A method and apparatus for forming reinforcing fibers for composites. The fibers comprise bundles of non-crystalline glass or carbon fibers formed in a helix and cut to small lengths for inclusion in molded composites to render the composites substantially isotropic.

3 Claims, 4 Drawing Sheets

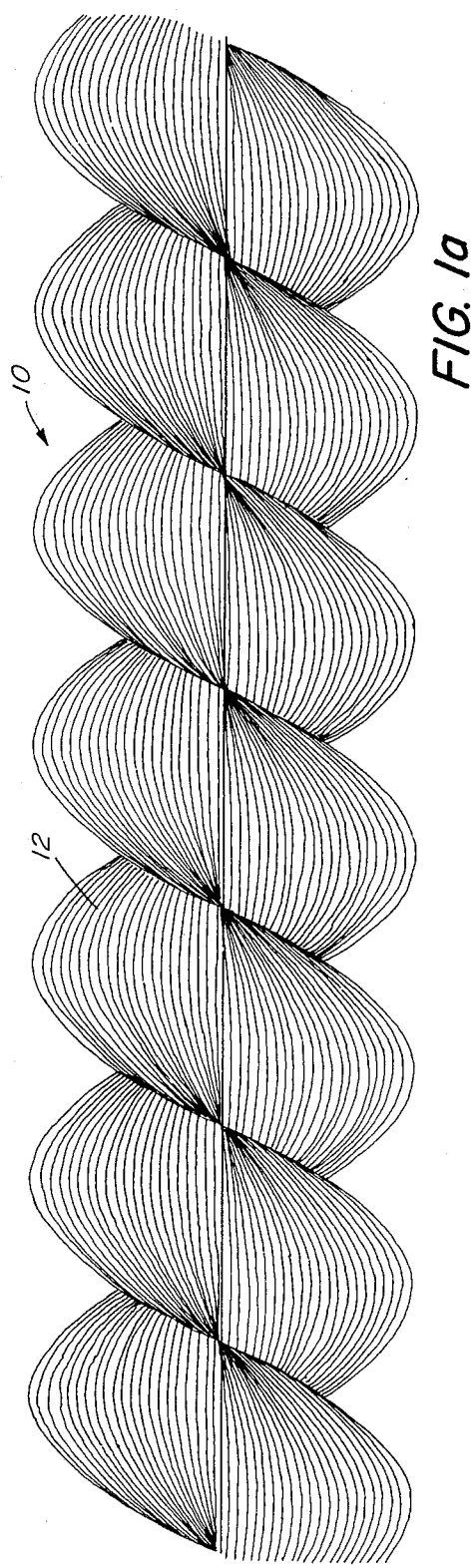
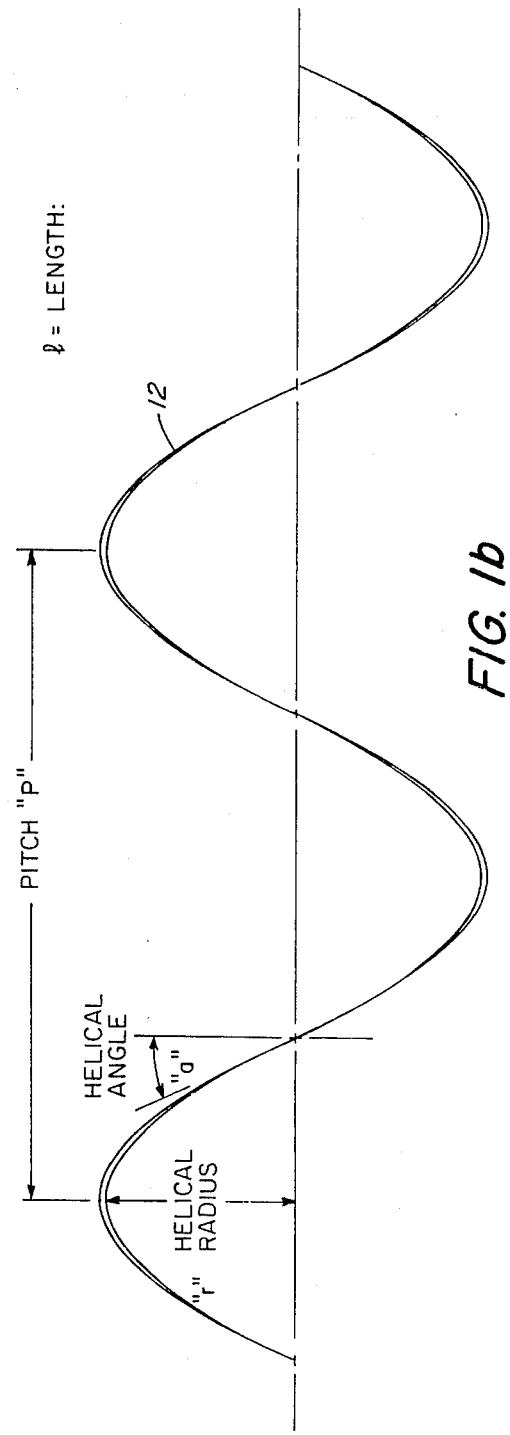
FIG. 1a
FIG. 1b

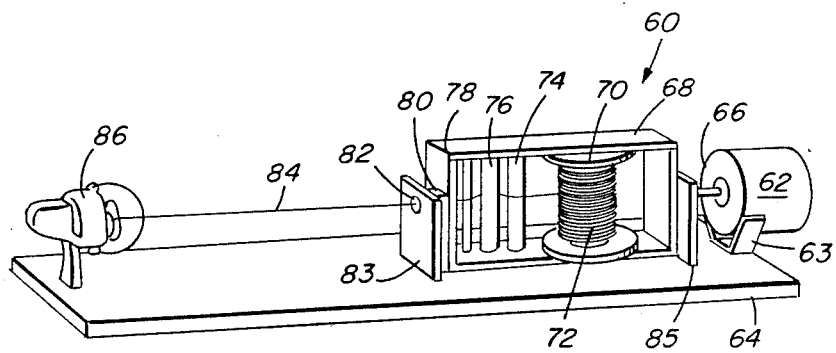
FIG. 8
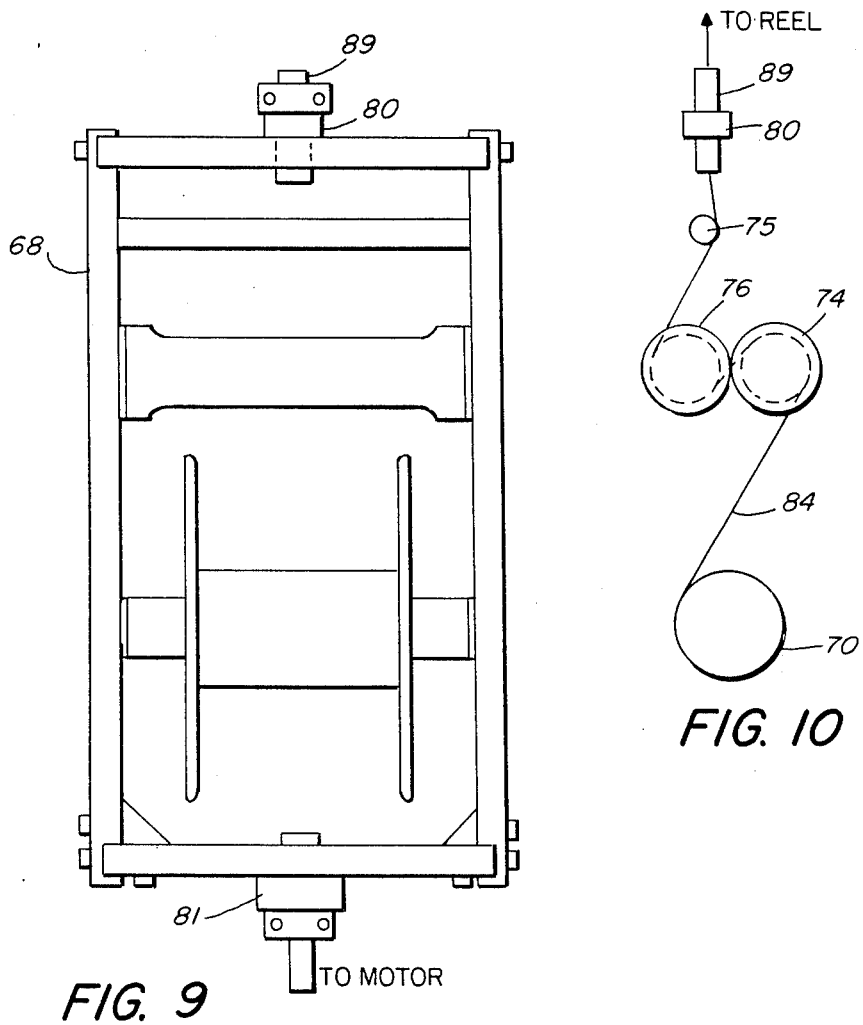
FIG. 9
FIG. 10

REINFORCING FIBERS

TECHNICAL FIELD

This invention is in the field of molded composite polymeric materials.

BACKGROUND ART

Fibers, comprised of materials, such as glass graphite, boron, etc., have heretofore been used as a filler to reinforce polymers, such as polypropylene, polyethylene, polystyrene, etc., to form composite structures. Typically, such fibers are formed in short, straight linear strands. Fiber reinforcement is an excellent way to increase polymer strength without destroying the weight and manufacturing advantages of plastics over other material, such as, wood, metals and ceramics.

Composite structures made of conventional short-fiber fillers suffer from several problems which occur as the result of the unidimensional nature of the filler. Since the fibers are essentially one-dimensional, the fibers tend to align in one direction in the mold, creating an anisotropic composite. In other words, the elastic properties of the composite are not the same in all directions. Because of this, the anisotropic composite has lower strength perpendicular to the plastic flow in the mold than in the direction of flow. It also has low strength at the weld lines where the fibers align and lose much of their reinforcing effect, thereby resulting in low predictability of properties. Efforts to prevent or minimize these problems, in the main, have been directed at techniques for preventing straight fiber alignment using specialized molds or creating magnetic fields to orient the fibers.

An exception to the above generality is the study by Y. Kagawa et al., reported in "Some Properties of Composite Metals Reinforced with Helical Fiber", *Composite Materials Ed., Proc. Japan - U.S. Conference*, Tokyo 1981. Kagawa studied the reinforcing properties of a single, large diameter (150 microns), continuous, helical tungsten fiber for a copper matrix composite.

DISCLOSURE OF THE INVENTION

In accordance with the present invention, certain problems inherent in uni-dimensional fiber formed composites are solved by providing helical fibers, which inherently reject fiber alignment during molding. More specifically, a plurality of relatively short helical fibers are used to form a substantially isotropic composite.

Preferably, the fibers are formed of amorphous, or non-crystalline glass material. The invention also includes a method and apparatus for forming glass helical fiber bundles in large quantities. In brief, volume production is achieved by rotating a bundle, formed of a plurality of individual fibers, i.e., 5000 strands, while maintaining the fiber bundle in constant tension. The helical fiber bundles thus formed are annealed and cut into appropriate short (¼ inch) lengths and the individual helical fibers are separated for use as fillers for molded composites.

This molded composite structure has at least the following advantages over the prior art:

A. The multitude of fibers penetrate the entire matrix providing uniform support throughout, whereas a single, large fiber will have a large local effect with very little effect in other axes or areas of the matrix.

B. The short fibers can be easily mixed and molded with the resin, but a single fiber must be specially aligned when making the specimen.

Furthermore, in accordance with the present invention, it has been found that relatively thin (6 micron) diameter fibers are better for isotropic reinforcement than the relatively thick (150 micron) diameter single fibers of Kagawa et al., because the local effects of the fiber/matrix interface are negligible with the thin fibers when the part is larger than approximately 8 $mm^3$. But with the thick fiber, the part must be larger than 64,000 $mm^3$, in diameter to diminish the local interface effects. The isotropic nature of the small helical fibers render them far more useful for potential mass production of composite fillers and improves the strength and bulk modulus of the composite product.

BRIEF DESCRIPTION OF THE DRAWINGS

FIG. 1a is a schematic drawing of a helical fiber bundle 10 in accordance with the invention.

FIG. 1b is a schematic illustration of a helical fiber bundle 12 showing the pertinent geometric parameters of the bundle.

FIG. 8 is a perspective view of the apparatus for continuous manufacture of helical fibers in accordance with the invention.

FIG. 9 is an enlarged view of the spinning chamber 68 showing the details of the spool and roller members of FIG. 8.

FIG. 10 is a schematicized side view showing the details of the fiber feed mechanism.

BEST MODE OF CARRYING OUT THE INVENTION

A. Helical Fibers

Referring now to FIGS. 1a and 1b, a helical fiber filler, in accordance with the invention, will be described in detail. In the embodiment of FIGS. 1a and 1b, a fiber filler bundle 10 is shown in greatly magnified scale. The filler is formed in a helix comprised of a large number of glass strands 12. Each bundle consists of about 5000 strands 12 wound in a helical shape and then annealed to relieve stress.

While other three-dimensional shapes, such as a three orthogonal axis structure, i.e., a child's jack, are contemplated to provide three-dimensional reinforcement properties the helix is preferred because of its continuous nature which facilitates mass production.

To optimize the reinforcement properties of the helical fibers, several interrelated geometric factors must be considered; the helical radius "r", the pitch "p", the radius of curvature "R", the helical diameter "2r", the helical angle "a" and the unwound length "l" of the fiber; as shown in FIG. 1b.

(a) Radius of Curvature

As the radius of curvature R decreases, the stress within the fibers increases. For a typical glass fibers, such as S-2449, the minimum radius of curvature R can be determined as follows: Let S be the ultimate stress of the glass fiber, e is the maximum strain within the fiber and $D_f$ the diameter of the fiber; then by definition:

$$S = Ee$$

where E is the Elastic Modulus of the fiber $$e = \frac{D_f}{2R}$$

so the minimum radius of curvature R of a fiber is $$R \geq \frac{D_f E}{2S}$$

For S-2449 glass, this minimum possible R is 60 um with only one heat treatment step.

(b) Diameter

The fiber helices should be small enough to disperse evenly through the composite structure to provide uniform support at the tightest corners and thinnest sections. In other words, the composite structure should behave as though it were homogeneous. On the other hand, the fibers must be long enough and the radii large enough to provide sufficient support. A thesis by Richard Von Turkovich, "Fiber Breakage in Reinforced Polymer Processing", January 1982, *Massachusetts Institute of Technology* concluded that the critical fiber length to reinforce composites is approximately 100 times the fiber diameter. Fibers below the critical length slipped out of the matrix providing very little support. This length is preferred as an ideal helix diameter to minimize fiber size and still provide support perpendicular to the helical axis. Therefore, for a 6.0 micrometer fiber diameter, a 300 micrometer helical radius size is preferred.

(c) Helical Angle

The helical angle is also critical for optimum isotropic reinforcement. To determine the ideal helical angle, the fiber should give the same support in all directions. The ideal helical angle will give equal support along the helical axis (z-axis) and perpendicular to it. Calculation of the ideal helical angle will be explained in connection with the force diagrams of FIGS. 2-4.

Figure 2:
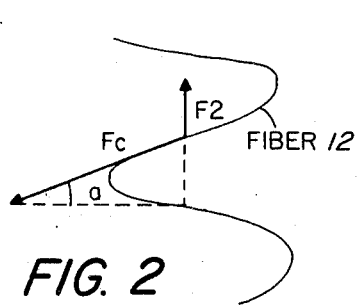
FIGS. 2, 3 and 4 are force diagrams illustrating the calculation of the ideal helical angle for producing an isotropic composite.

The z-axis force diagram is shown in FIG. 2. The force Fc required to break the strand is proportional to the applied force in the z-direction Fz.

$$Fz = Fc \sin a,$$

wherein "a" is the helical angle.

Figure 3:
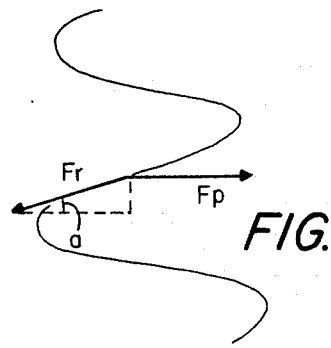

Calculating the force perpendicular to the helical axis Fp, which is equal to Fz at the ideal helical angle, is more complex since there are two vector components, r and O. The r-component is the proportion of the force being applied in the plane perpendicular to the helical axis. The O component is the portion of the force in the $F_p$ plane being applied along one axis, perpendicular to the helical axis. The r-component from FIG. 3 is simply:

$$Fp = Fr \cos a$$

Figure 4:
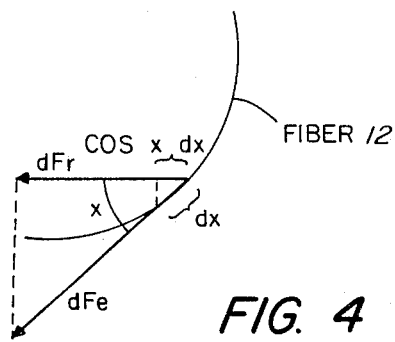

The O component is more complex because it is dependent on the angle x which is a variable indicating the position of a fiber section from an arbitrary axis. This angle x changes for different parts of the helix. FIG. 4 shows the relationship between dFr and dFo which is:

$$dFr/dFo = \cos x \, dx/dx$$

Integrating this expression between pi/2 and 0 yields $$Fr = 0.637 \, Fo$$

The fiber breaking force Fc is equated to Fo, thus:

$$Fo = 0.637 \, Fp \cos a;$$

Equating Fz and Fo yields:

$$\tan a = 0.637$$

The ideal or optimum helical angle is therefore 32.5 degrees.

B. Method and Apparatus for Manufacturing Helical Isotropic Fibers

Figure 5:
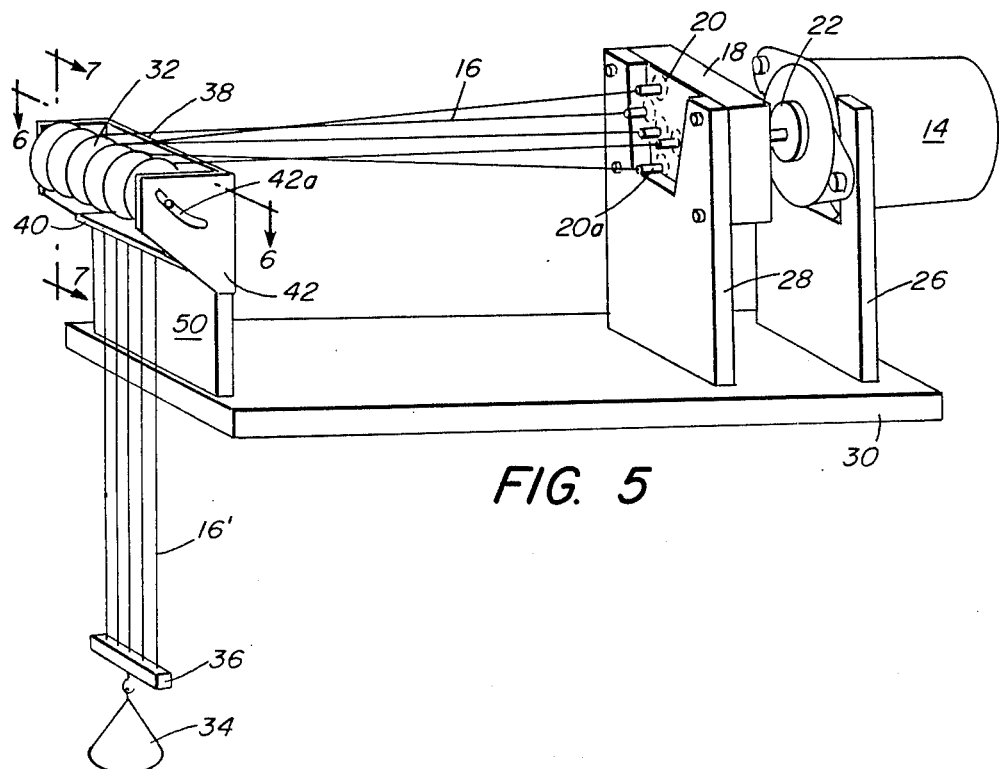
FIG. 5 is a perspective of a discontinuous method and apparatus for simultaneously forming a plurality of helical fibers.
Figure 6:
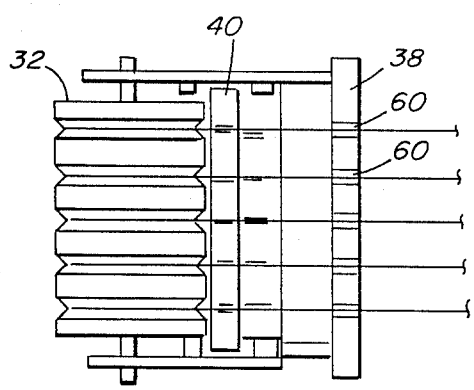
FIG. 6 is a partial sectional view along the lines 6—6 of FIG. 5 showing the details of the roller mechanism and guide structures of FIG. 5.
Figure 7:
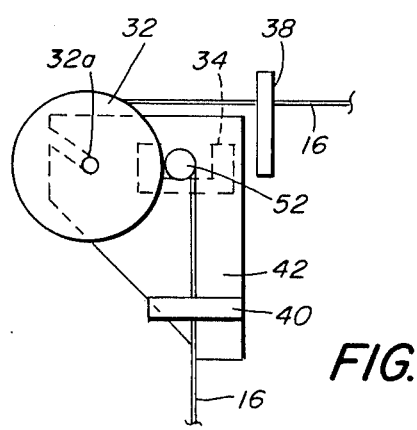
FIG. 7 is an enlarged side sectional view along the lines 7—7 of FIG. 5 showing further details of the roller mechanism and mounting bracket for the rollers.

Referring now to FIGS. 5, 6 and 7, a first embodiment of a method and apparatus for manufacturing helical fibers for reinforcement of composites will be described in connection therewith.

As shown therein, a motor 14 is mounted on a support 26 resting on a platform 30 such that the motor axle 22 is vertically aligned with a gear box 18 in which five rotors or planetary gears 20 driven by axle 22 are mounted, as shown. The rotor output shafts 20a are attached to individual fibers 16 comprising a plurality of strands of glass fibers of about 60 inches in length. The fibers 16 extend over a first set of guide rails 38, a set of rollers 32 and a lower second set of guide rails 40 to a holder 36 which is attached to a weight 34.

Gear box 18 is held in vertical alignment with motor axle 22 by means of a second support 28 affixed to platform 30. Likewise, the rollers 32 and guide rails 40 and 38 are attached to bracket 42 mounted on support member 50 which is mounted on platform 30. Roller axle 32a is removably mounted on bracket 42 by being inserted in slot 42a of bracket 42.

The purpose of the weight 34 is to maintain the fibers under constant tension. In a preferred embodiment of the invention, a 100 gram weight is utilized. The purpose of the grooved rollers 32 and guides 38 and 40 is to prevent tangling of the fibers during twisting.

FIGS. 6 and 7 show the details of the rollers in more detail. The fibers 16 are passed through 450° of arc over roller 32 and roller 52 mounted on internal bracket 54, shown in dotted lines in FIG. 7.

The 450° arc is sufficient to dissipate the torque on the fibers which tends to cause the fibers to jump out of the grooves in the rollers. Any such tendency is avoided by the use of the plastic supports 38 and 40 which contain the fibers within the five saw cut guides 60 in each of the guide members, thereby preventing fiber intermingling. Furthermore, dissipating the torque via the 450° angle of arc prevents the free-hanging weight 34 from spinning and tangling up the fibers. Note that the rollers 32 and 52 are loosely set in place to allow quick removal and replacement when inserting the fibers. Preferably, the weight 34 should hang about 4 feet below the rollers since the formation of the helix by rotating the fibers kinks and shortens the fiber bundle.

As the fibers spin, the weight rises until it reaches the fiber guides, at which time the motor is stopped. Completed helixes are then removed from the machine with wire cutters and retained in the helical shape by suitable retaining members, such as taped alligator clips, such that the helix is retained in the fibers until the fibers are annealed in the next step of the process.

Rotational speeds of up to about 1000 r.p.m. may be achieved without tangling the fibers. By suitable matching of the number of fibers in a spun bundle, versus the number of revolutions per unit length of fiber, versus the amount of tension on the fibers, the desired optimum helical angle can be attained.

It should be noted that when annealing fibers, it is important that each fiber be coated with a protective sizing or coupling agent to protect the fibers from scratches and the environment and to improve adhesion between the fibers and the polymer in the formation of a composite structure. Preferably, an organosilane coupling agent should be utilized. In this connection, a Dow Corning Z-6040 silane is preferred because it is particularly suited for use with glass fibers in thermoplastics and is much less toxic than other options. The silane should be applied to bare fibers, both before and after the annealing process.

A satisfactory annealing temperature is in the range of about 1600° F. After the helical fibers are annealed and a new coupling agent applied, the fibers may then be cut into appropriate lengths, such as ¼ inch, for use as fillers in composite structures.

An alternative method and apparatus for forming helical fibers will now be described in connection with FIGS. 8, 9 and 10. In this embodiment, a continuous stream of helical fibers is formed by holding a spool of fibers within a spinning chamber 68 which contains a series of rollers 74, 76 and 75 to prevent the spun fibers from backing up on the spool 70.

As may be seen in FIG. 8, the spinning chamber 68 is rotatably mounted on bearings 80 and 81 and supported by aluminum posts 83 and 85 attached to platform 64. Bearing 81 is coupled to the axle 66 of motor 62. Motor 62 is maintained in vertical alignment with bearing 81 by means of post 63 mounted to platform 64. Bearing 80 is mounted on a hollow shaft 89 to allow the fibers to feed through to a reel 86. The reel 86 is a well-known fishing reel with a removable spool which may be placed in a heater for annealing after spinning.

It is important to utilize a very lightweight spool with a low moment of inertia to avoid creating a gyroscopic torque effect when the spool is spinning, which results in a resistive force that establishes excessive tension on the fibers during unreeling. The mechanical resistance of the spool should be made adjustable by applying a variable source of friction to the spool mechanism.

Helical fibers, made in accordance with the method and apparatus above described, may be cut into ¼ inch helical lengths and suitably dispersed with polypropylene in a ratio of about 3-1 grams of helical fibers to grams of polypropylene and placed into an injection molding machine to produce an isotropic composite structure of fiber and polypropylene.

Equivalents

This completes the description of a preferred embodiment of the invention. It will be obvious, however, to those skilled in the art, without departing from the invention in its broader aspects, to devise equivalents, thereto. For example, it is contemplated that other material, such as boron, silicon carbide, carbon and iron may be substituted for glass for use in fabricating the helical fibers of the invention. For example, helical carbon fibers can be manufactured by first producing helical polymeric fibers and degrading them to produce carbon helical fibers. Such helical carbon fibers can be made in a manner similar to the glass fiber process described above. In the carbon fiber process, a helical polymeric fiber is first formed, as described above, using a suitable polymer, such as polyacrylonitrile, using a suitable annealing temperature, coating material and tension appropriate for the polymer. Next, the polymeric fiber bundle produced above is subjected to an oxidizing atmosphere of about 220° C., while the fibers are held in tension, for a sufficient time period to enable the oxygen to penetrate into the organic polymer. Next, the fibers are heated in a non-oxidizing atmosphere at about 1000° C. under tension to create helical carbon fibers. A variety of polymers may be employed to produce the composite, such as polyethylene, polystyrene, epoxy, etc.

Helical glass fibers made in accordance with the invention have been tested and shown to survive the extrusion process much better than identically prepared straight fibers. For example, the average helical fiber was 45% longer than the average straight fiber after extrusion. This suggests that helical fibers are better than straight fibers for reinforcement. After injection molding, the helical fibers divided out into individual helical strands, as opposed to helical fiber bundles, indicating that the helical fibers are capable of being processed in the same way as conventional fibers.

I claim:

1. Helical fibers for use as a filler material in the formation of composite plastic structures to improve the strength, modulus, or isotropicity thereof comprising a plurality of glass fibers, each fiber being wound in a helix, coated with a silane coupling agent, stress relieved by annealing and having a relatively short length of about one-fourth inch.

2. The fibers of claim 1 in which the helical angle is about 30°.

3. The fibers of claim 2 wherein the fibers are formed of amorphous or non-crystalline glass.

* * * * *